(No Model.)

W. S. KISINGER.
WATER SPRINKLER.

No. 447,778. Patented Mar. 10, 1891.

Attest.
Samuel M. Quinn.
M. E. Layman.

Inventor.
William S. Kisinger.
by James H. Layman.
Atty.

UNITED STATES PATENT OFFICE.

WILLIAM S. KISINGER, OF BELLEVUE, KENTUCKY, ASSIGNOR TO HENRY G. STIEBEL, OF CINCINNATI, OHIO.

WATER-SPRINKLER.

SPECIFICATION forming part of Letters Patent No. 447,778, dated March 10, 1891.

Application filed October 20, 1890. Serial No. 368,640. (No model.)

*To all whom it may concern:*

Be it known that I, WILLIAM S. KISINGER, a citizen of the United States, residing at Bellevue, in the county of Campbell and State of Kentucky, have invented certain new and useful Improvements in Water-Sprinklers; and I do hereby declare the following to be a full, clear, and exact description of the invention, reference being had to the annexed drawings, which form part of this specification.

This invention relates to those centrifugal sprinklers which are attached to watering carts or wagons and driven by suitable connections with the rear wheels of the vehicle; and my improvement comprises a novel arrangement of two valve-guarded ventages or nozzles, which enable the jets of water to be thrown to either or both sides of the street or roadway, from a single disk armed with suitable blades, buckets, or vanes, as hereinafter more fully described.

Figure 1:
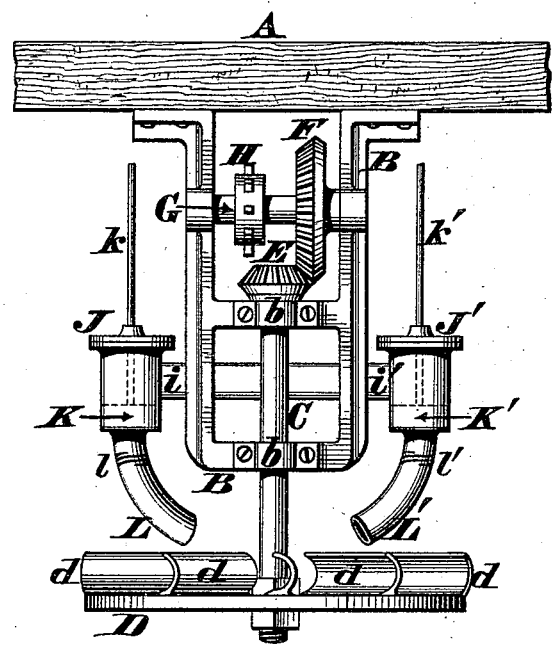
Figure 2:
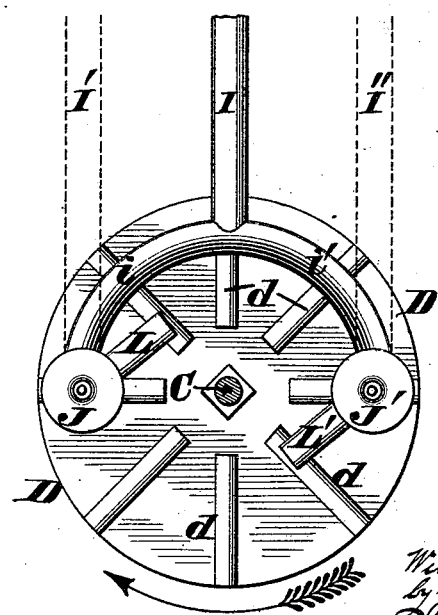

In the annexed drawings, Figure 1 is a rear elevation of a water-sprinkler embodying my improvements. Fig. 2 is a plan of the same, the hanger being omitted and the main shaft sectioned.

A represents a portion of the rear frame of a watering cart or wagon, or other similar vehicle, and B is a hanger depending rigidly from said frame, boxes $b$ $b$ being attached to said hanger for the support of a main vertical shaft C, the lower end of which carries a disk D, armed with a series of concave buckets or vanes $d$. The upper end of this main shaft has a bevel-pinion E attached to it, which pinion gears with a bevel-wheel F of counter-shaft G, the latter having a pulley or sprocket-wheel H, driven by a belt or chain connection with the hind wheels or axle of the vehicle, the arrangement of these connections being such as to impart a high velocity to the sprinkler proper D $d$.

I is a pipe leading to the tank or barrel, and $i$ $i'$ are branches connecting said pipe with chambers J J', the latter being provided with valves K K', having stems $k$ $k'$, operated by suitable means.

L L' are ventages or nozzles reaching from these valve-chambers down almost to the buckets $d$.

In constructing this sprinkler care must be taken to arrange the gearing in such a manner as to cause the disk D to revolve in the direction of the arrow seen in Fig. 2; or, in other words, in the direction of the concave sides of the buckets or vanes. Care must also be taken to locate the nozzles L L' about diametrically opposite each other, in order that one of them may supply the front half of the disk with water, while the other ventage supplies the rear half. If the water is to be thrown to the left while the vehicle advances, the valve K' is opened, so as to cause the disk to be supplied with water from the nozzle L'; but if the water is to be thrown to the right the valve K is opened and the disk is then supplied from the other nozzle L. When it is desired to throw water both to the right and left, the valves K and K' are opened, so as to bring the pair of nozzles L L' into service, and thereby supply the front and rear portions of the disk with sufficient fluid to sprinkle a street from curb to curb. It will thus be seen that the present arrangement of sprinkler performs the work of two disks, such as heretofore employed, simplifies the construction of the machine, reduces the weight one-half, and renders the apparatus less liable to derangement.

The dotted lines I' I'' in Fig. 2 indicate that the branches $i$ $i'$ may be omitted and the chambers J J' be connected directly to the tank by independent supply-pipes, if desired. Finally, the nozzles L L' can be composed of upper and lower pipes, coupled together at $l$ $l'$, so as to enable the ventages to be set at whatever angle may be the most appropriate to secure the desired results. The exact angle, however, cannot be specified, inasmuch as it will vary with the size of the disk D, the velocity with which it is driven, and the shape of its buckets $d$.

I claim as my invention—

1. A centrifugal sprinkler consisting of a single plate or disk armed with a series of buckets or vanes, in combination with a pair of ventages having independent cut-offs, one of which ventages discharges in front of the disk-shaft, while the other ventage discharges in the rear of said shaft, in order that the single disk may disperse the jets either to the right or left of the machine or to both sides of the same, substantially as herein described.

2. In combination with a centrifugal sprinkler, a pair of angularly-adjustable ventages or nozzles adapted to discharge water on the front and rear surfaces of a single disk, each ventage being provided with an independent valve or cut-off, substantially as herein described, and for the purpose stated.

In testimony whereof I affix my signature in presence of two witnesses.

WILLIAM S. KISINGER.

Witnesses:
JAMES H. LAYMAN,
A. W. McCORMICK.